(12) United States Patent
Kim

(10) Patent No.: US 10,789,717 B2
(45) Date of Patent: Sep. 29, 2020

(54) APPARATUS AND METHOD OF LEARNING POSE OF MOVING OBJECT

(71) Applicant: Electronics and Telecommunications Research Institute, Daejeon (KR)

(72) Inventor: Jin Woo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 100 days.

(21) Appl. No.: 16/198,536

(22) Filed: Nov. 21, 2018

(65) Prior Publication Data

US 2019/0164301 A1    May 30, 2019

(30) Foreign Application Priority Data

Nov. 24, 2017  (KR) .................. 10-2017-0157937
Nov. 19, 2018  (KR) .................. 10-2018-0142345

(51) Int. Cl.
*G06T 7/246*     (2017.01)
*G06T 17/20*    (2006.01)
(Continued)

(52) U.S. Cl.
CPC ............ *G06T 7/251* (2017.01); *G06K 9/6202* (2013.01); *G06K 9/6253* (2013.01); *G06K 9/6256* (2013.01); *G06T 7/80* (2017.01); *G06T 17/20* (2013.01); *G06T 19/20* (2013.01); *G06K 2209/23* (2013.01); *G06K 2209/27* (2013.01); *G06T 2207/20081* (2013.01); *G06T 2207/20084* (2013.01); *G06T 2207/20101* (2013.01);
(Continued)

(58) Field of Classification Search
CPC ............ G06T 7/251; G06T 17/20; G06T 2207/20101; G06T 2207/20212; G06T 207/30248; G06T 2207/20084; G06T 2207/20081; G06T 7/80; G06K 9/6202; G06K 9/6253; G06K 9/6256; G06K 2209/23; G06K 2209/27
USPC ........................................... 382/103; 345/426
See application file for complete search history.

(56) References Cited

U.S. PATENT DOCUMENTS 8,515,982 B1   8/2013  Hickman et al.
8,571,302 B2  10/2013  Yoon et al.
(Continued)

FOREIGN PATENT DOCUMENTS

KR   1020100020054 A    2/2010

OTHER PUBLICATIONS

Tsung-Yi Lin et al., "Microsoft COCO: Common Objects in Context", Feb. 21, 2015, pp. 1-15, ECCV.

*Primary Examiner* — Congvan Tran
(74) *Attorney, Agent, or Firm* — William Park & Associates Ltd.

(57) ABSTRACT

Provided is a method of learning a pose of a moving object. The method includes determining 3D feature points in the 3D mesh model obtained by previously modeling a general shape of a moving object, fitting the 3D mesh model to the 2D learning image obtained by previously photographing the real shape of the moving object with respect to the determined 3D feature points, obtaining learning data associated with pose estimation of the moving object from the 2D learning image with the 3D mesh model fitted thereto, and learning a pose estimation model estimating a pose of a target moving object included in one real image obtained by the camera by using the learning data.

19 Claims, 4 Drawing Sheets

(51) Int. Cl.
*G06K 9/62* (2006.01)
*G06T 7/80* (2017.01)
*G06T 19/20* (2011.01)

(52) U.S. Cl.
CPC ............... *G06T 2207/20212* (2013.01); *G06T 2207/30248* (2013.01); *G06T 2219/2016* (2013.01)

(56) References Cited

U.S. PATENT DOCUMENTS

| | | |
|---|---|---|
| 2010/0033484 A1* | 2/2010 | Kim ..................... G06T 19/006 345/426 |
| 2010/0040279 A1 | 2/2010 | Yoon et al. |
| 2015/0187216 A1 | 7/2015 | Kwak |
| 2016/0033963 A1 | 2/2016 | Noh |
| 2017/0004659 A1* | 1/2017 | Boichentsov ....... G06F 3/04845 |
| 2018/0247427 A1* | 8/2018 | Geiger ............... G06K 9/00369 |

\* cited by examiner

APPARATUS AND METHOD OF LEARNING POSE OF MOVING OBJECT

CROSS-REFERENCE TO RELATED APPLICATIONS

This application claims priority under 35 U.S.C. § 119 to Korean Patent Application No. 10-2017-0157937, filed on Nov. 24, 2017 and Korean Patent Application No. 10-2018-0142345, filed on Nov. 19, 2018, the disclosure of which is incorporated herein by reference in its entirety.

TECHNICAL FIELD

The present invention relates to technology for estimating a pose of a moving object.

BACKGROUND

Self-driving vehicles denote vehicles that recognize an ambient environment to self-drive to a destination without intervention of a driver, based on self-driving technology. Recognition of an ambient environment is performed based on recognizing and estimating an object (hereinafter referred to as a moving object) placed around a self-driving vehicle.

Estimation of a pose (or a head pose) of a moving object is needed for recognizing and estimating a moving object. Pose estimation is a concept of estimating a position (a three-axis position) and a moving direction (three-axis bearings) of a moving object.

Recently, the self-driving technology processes a plurality of continual images (at least three continual images) captured by a camera (for example, a single camera, a multi-camera, a stereo camera, a depth camera, or the like) to estimate a pose of a moving object, for estimating a position and a direction of the moving object. In this manner, in the related art, since a plurality of continual images are processed for estimating a pose of a moving object, it is difficult to process the images in real time.

SUMMARY

Accordingly, the present invention provides an apparatus and method of estimating a pose of a moving object, based on one image including the moving object.

In one general aspect, a method of learning a pose of a moving object, performed by a pose learning apparatus including a camera, an input interface, a storage unit storing a three-dimensional (3D) mesh model and a two-dimensional (2D) learning image, and a processor module processing the 2D learning image on basis of the 3D mesh model, includes: by using the processor module, determining 3D feature points in the 3D mesh model obtained by previously modeling a general shape of a moving object; fitting the 3D mesh model to the 2D learning image obtained by previously photographing the real shape of the moving object with respect to the determined 3D feature points; obtaining learning data associated with pose estimation of the moving object from the 2D learning image with the 3D mesh model fitted thereto; and learning a pose estimation model estimating a pose of a target moving object included in one real image obtained by the camera by using the learning data.

In another general aspect, an apparatus for learning a pose of a moving object includes: a camera; an input interface; a storage unit configured to store a three-dimensional (3D) mesh model obtained by previously modeling a general shape of a moving object and a two-dimensional (2D) learning image captured by photographing a real shape of the moving object; and a processor module configured to process the 2D learning image, based on the 3D mesh model, wherein, based on a user input received through the input interface, the processor module fits the 3D mesh model to the 2D learning image with respect to 3D feature points determined in the 3D mesh model, obtains learning data associated with pose estimation of the moving object from the 2D learning image with the 3D mesh model fitted thereto, and learns a pose estimation model estimating a pose of the moving object included in one real image captured by the camera by using the obtained learning data.

In another general aspect, an apparatus for learning a pose of a moving object includes: a camera; an input interface; a storage unit configured to store a three-dimensional (3D) mesh model obtained by previously modeling a general shape of a moving object and a two-dimensional (2D) learning image captured by photographing a real shape of the moving object; a feature point determination module configured to determine 3D feature points in the 3D mesh model, based on a user input received through the input interface; a fitting module configured to fit the 3D mesh model to the 2D learning image; a data extraction module configured to extract learning data associated with pose estimation of the moving object from the 2D learning image with the 3D mesh model fitted thereto and to store the extracted learning data in the storage unit; a learning module configured to learn a pose estimation model estimating a pose of a target moving object by using the learning data stored in the storage unit; and a pose estimation module configured to estimate the pose of the target moving object included in one image captured by the camera by using the pose estimation model.

Other features and aspects will be apparent from the following detailed description, the drawings, and the claims.

DETAILED DESCRIPTION OF EMBODIMENTS

Figure 1:
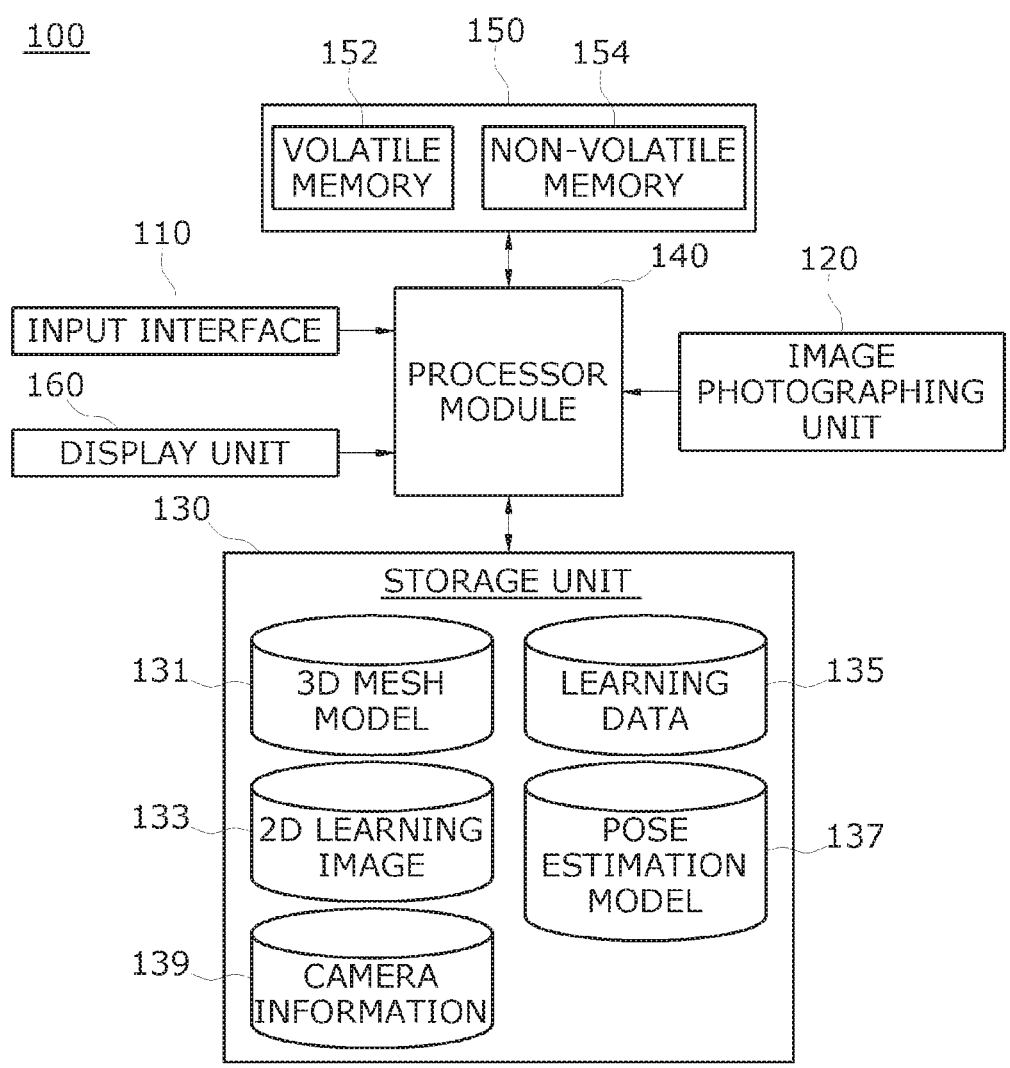
FIG. 1 is a flowchart illustrating a method of estimating a pose of a moving object according to an embodiment of the present invention.

Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "or" includes any and all combinations of one or more of the associated listed items. For example, "A or B" may include A, include B, or include A and B. It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the present invention, and similarly, the second element may also be referred to as the first element. In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

In the following description, the technical terms are used only for explain a specific embodiment while not limiting the present invention. The terms of a singular form may include plural forms unless referred to the contrary. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to pose estimation of a moving object. According to embodiments of the present invention, unlike a related art estimation method that estimates a pose of a moving object by using a plurality of continual images obtained from a single camera or a multi-camera, a pose of a moving object may be estimated based on one image including the moving object.

According to embodiments of the present invention, in order to estimate a pose of a moving object on the basis of one image, a machine learning model (hereinafter referred to as a pose estimation model) learned to estimate a pose of a moving object may be built by using a two-dimensional (2D) learning image processed based on a three-dimensional (3D) mesh model.

According to embodiments of the present invention, in order to build the pose estimation model, learning data (or training data) needed for learning the pose estimation model may be constructed.

Learning data according to embodiments of the present invention may be constructed through processing based on a 3D mesh model obtained by previously modeling a general shape of a moving object and a 2D learning image obtained by photographing a real shape of the moving object and may include feature information robust to pose estimation of the moving object.

Therefore, a pose estimation model learned based on the learning data according to embodiments of the present invention may estimate a pose of a moving object by using one image, thereby improving a processing speed and an operation load which occurs due to processing of a plurality of images.

Hereinafter, example embodiments of the present invention will be described in detail with reference to the accompanying drawings.

FIG. 1 is a flowchart illustrating a method of estimating a pose of a moving object according to an embodiment of the present invention.

Referring to FIG. 1, a pose learning apparatus 100 for learning a pose of a moving object may generate a pose estimation model learned to estimate a pose of a moving object by using learning data including feature information robust to the pose estimation of the moving object (a target moving object).

In the present embodiment, an example where a moving object of which a pose is to be estimated is a vehicle will be described, but the present embodiment is not limited thereto. When a moving object is limited to a vehicle, the pose learning apparatus 100 according to an embodiment of the present invention may be installed in, for example, a self-driving vehicle.

The pose learning apparatus 100 according to an embodiment of the present invention may be included in an electronic device having a communication function. Examples of the electronic device may include a smartphone, a tablet personal computer (PC), a mobile phone, a video phone, an e-book reader, a desktop PC, a laptop PC, a netbook PC, a personal digital assistant (PDA), a portable multimedia player (PMP), a server, etc.

The pose learning apparatus 100 according to an embodiment of the present invention, as illustrated in FIG. 1, may include an input interface 110, an image photographing unit 120, a storage unit 130, a processor module 140, a memory 150, and a display unit 160.

The input interface 110 may be an element for generating a user input (a user command) according to an input manipulation of a user, and for example, may be a mouse, a keyboard, a touch screen, or the like.

The image photographing unit 120 may photograph a vehicle (hereinafter referred to as a target vehicle) placed around a self-driving vehicle to capture an image of the target vehicle. The image photographing unit 120 may be configured with one camera and may be a low-performance camera having a low resolution. Hereinafter, the image photographing unit 120 may be referred to as a camera 120.

A plurality of databases 131, 133, 135, and 137 may be stored in the storage unit 130.

The storage unit 130 may include a plurality of storage areas which are physically and logically divided, and the plurality of databases 131, 133, 135, and 137 may be respectively stored in the plurality of storage areas.

The database 131 may include a 3D mesh model obtained by previously modeling a general shape of a vehicle. The 3D mesh model may be a model including a set of vertices, edges, and faces defining a shape of a polyhedral object in a 3D computer graphics. The 3D mesh model may include 3D geometrical information representing a 3D position of each of the vertices, connection information representing a geometrical connection structure between vertices, and attribute information including a color, a normal line, and texture coordinates.

The database 133 may include a 2D learning image obtained by previously a real shape of the vehicle at a plurality of viewpoints. The 3D mesh model and the 2D learning image may be used as source data for building learning data used to learn a pose estimation model.

The database 135 may include learning data which is obtained by the processor module 140 processing the 2D learning image, based on the 3D mesh model.

The database 137 may include a pose estimation model which has been learned by the processor module 140 by using the learning data.

The storage unit 130 may further store camera information about a camera equipped in the vehicle.

The camera information may include intrinsic parameters and extrinsic parameters. The intrinsic parameters may denote parameters, such as a focal length, an aspect ratio, and a principal point, of the camera, and the extrinsic parameters may denote parameters associated with a geometrical relationship, such as an installation height and direction (fan, tilt, etc.) of the camera, between the camera and an external space. The camera information may be used for camera calibration which will be described below.

The storage unit 130 may include a hard drive or a solid state drive (SSD).

The processor module 140 may process the 2D learning image, based on the 3D mesh model stored in the storage unit 130 and may obtain learning data from the processed 2D learning image.

The processor module 140 may build and update a pose estimation model which is learned to estimate a pose of a target vehicle (a peripheral vehicle) included in the one image, based on the obtained learning data.

The processor module 140 may process a plurality of processes, for building and updating the pose estimation model.

The plurality of processes may include a first process that determines 3D feature points in the 3D mesh model, a second process that fits the 3D mesh model to the 2D learning image with respect to the determined 3D feature points, a third process that extracts learning data associated with pose estimation of the vehicle from the 2D learning image with the 3D mesh model fitted thereto, and a fourth process that learns the pose estimation model for estimating a pose of a target vehicle included in one image by using the learning data.

The processes will be described below in detail with reference to FIG. 2.

The processor module 140 may be implemented as at least one general-use microprocessor (CPU), at least one graphics processor (GPU), a system on chip (SoC), or a system in package (SiP).

The processor module 120 may drive, for example, an operating system (OS) or an application program to perform processing of arithmetic operation of various pieces of data.

The processor module 140 may drive the OS or the application program so as to perform processing and arithmetic operation of command, data, or information received from the other elements 110, 120, and 130.

The processor module 140 may load or store intermediate data or result data, generated in a processing operation, into or in the memory 150. For example, the processor module 140 may load the intermediate data into a volatile memory 152 and may store the result data in a non-volatile memory 154.

Examples of the volatile memory 152 may include random access memory (RAM) (for example, a dynamic RAM (DRAM), static RAM (SRAM), synchronous DRAM (SDRAM)). Examples of the non-volatile memory 154 may include one time programmable read-only memory (ROM) (OTPROM), programmable read-only memory (PROM), erasable programmable read-only memory (EPROM), electrically erasable programmable read-only memory (EEPROM), mask ROM, flash ROM, and flash memory.

The display unit 160 may display the intermediate data and the result data which are generated in a processing operation performed by the processor module 140 and may be implemented as a liquid crystal display (LCD) or an organic light emitting display (OLED).

Figure 2:
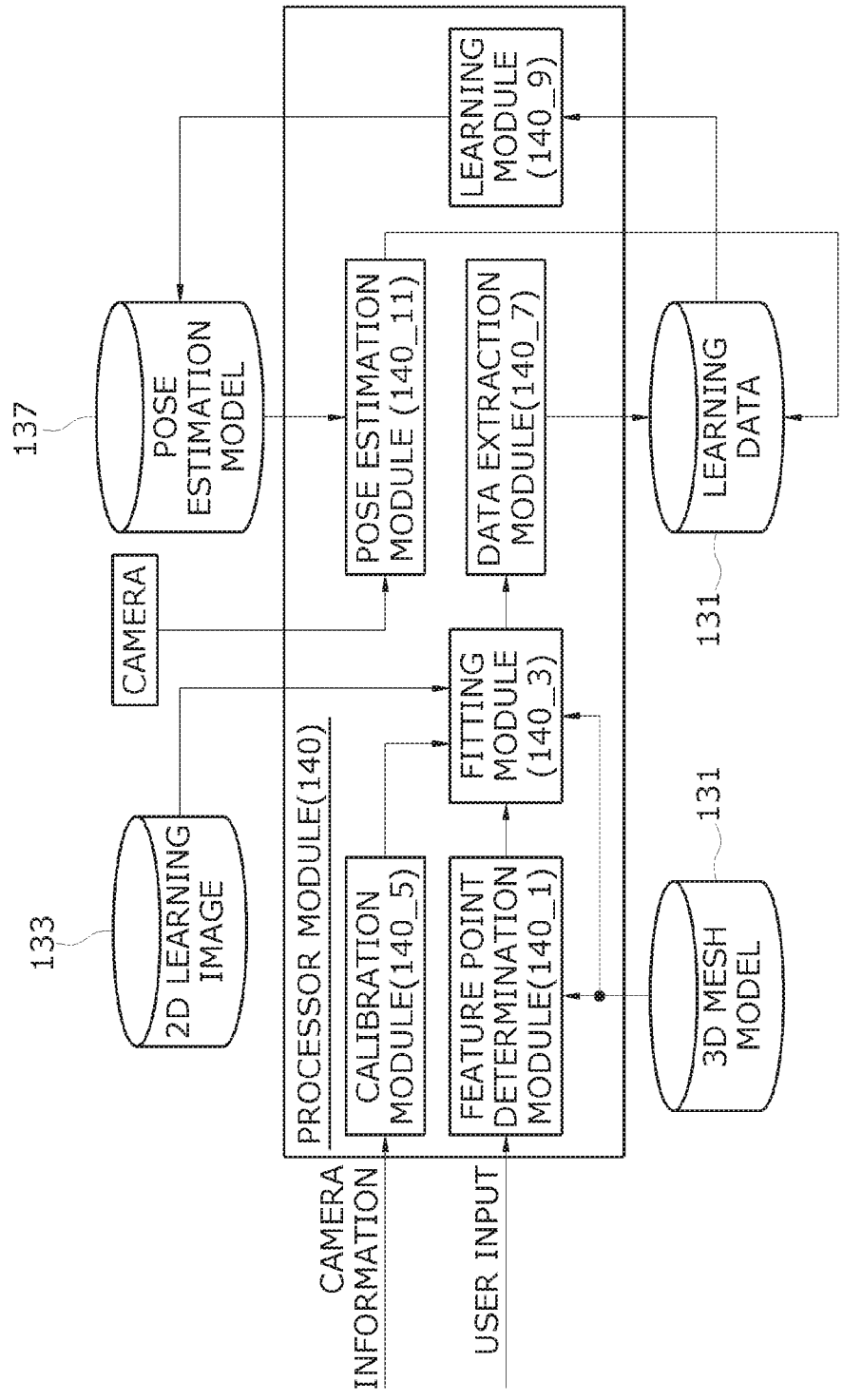
FIG. 2 is a block diagram illustrating an internal configuration of a processor module illustrated in FIG. 1.

FIG. 2 is a block diagram illustrating an internal configuration of the processor module 140 illustrated in FIG. 1.

The processor module 140 may include, for example, a plurality of modules divided in units of function blocks. For example, the processor module 140 may include a feature point determination module 140_1, a fitting module 140_3, a calibration module 1405, a data extraction module 140_7, a learning module 140_9, and a pose estimation module 140_11.

Feature Point Determination Module 140_1

The feature point determination module 140_1 may call a 3D mesh model included in the database 131 and may determine a 3D feature point in the called 3D mesh model according to a user input received through an input interface (110 of FIG. 1).

The determination of the 3D feature point may be a process of again defining, by a user, the 3D mesh model. That is, the user may define a feature point robust to pose estimation of a vehicle in the 3D mesh model.

The 3D feature point determined by the user may be defined based on a call command and a selection command each included in the user input.

For example, the processor module 140 may call the 3D mesh model (30 of FIG. 3) in the database 131 according to the call command and may display the called 3D mesh model 30 on a display screen of the display unit (160 of FIG. 1).

Subsequently, the processor module 140 may recognize the 3D feature point defined by the user in the 3D mesh model in response to a selection command generated based on a manipulation of a mouse or an arrow key by the user or a selection command generated based on a screen touch.

The 3D feature points may be points which are recognized by the user as a feature robust to pose estimation of a vehicle. For example, as illustrated in FIG. 3, the 3D feature points may include an emblem 31, a corner 32' of a vehicle number plate 32, a corner 38' of a headlight 38, a corner 34' of a radiator grille 34, a corner 35' of an air intake hole 35, a corner of a muffler, a hub 36' of a wheel, a corner 37 of a side mirror, and a corner 39' of a pillar 39 that connects a loop and a bod of a vehicle.

Figure 3:
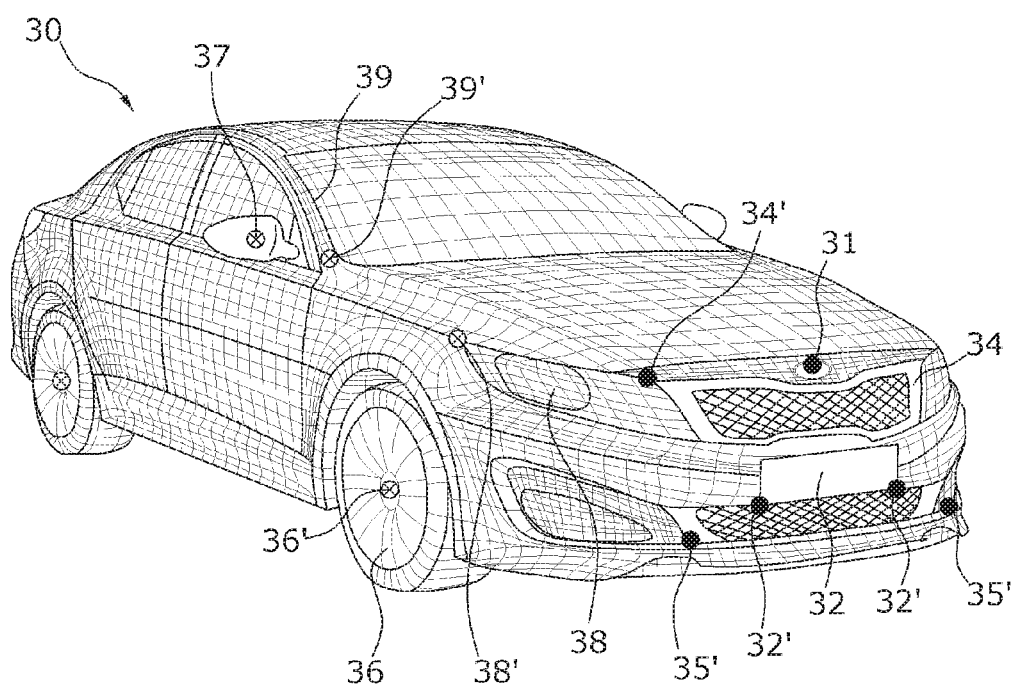
FIG. 3 is a diagram illustrating three-dimensional (3D) feature points directly defined by a user in a 3D mesh model according to an embodiment of the present invention.

3D feature points defined by the user among 3D feature points illustrated in FIG. 3 may be configured to have a correlation therebetween so as to fit or project the 3D mesh model 30 to a 2D learning image.

The 3D feature points being configured to have a correlation therebetween may denote that a predetermined number or more of 3D feature points are determined in at least two adjacent viewpoints of four viewpoints which look at the 3D mesh model.

Figure 4:
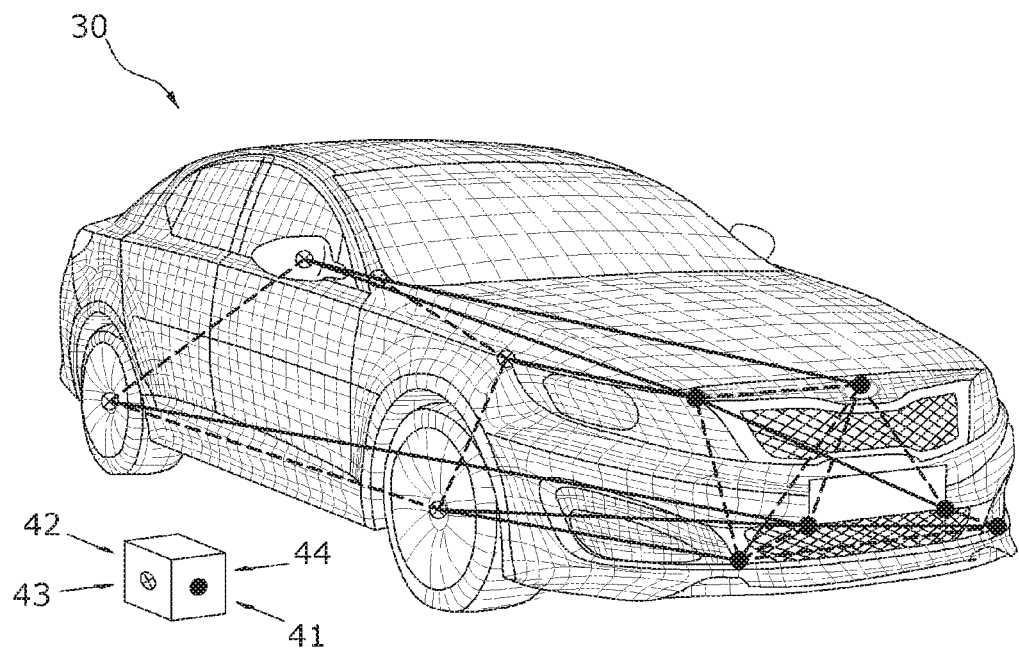
FIG. 4 is a diagram for describing a correlation between 3D feature points according to an embodiment of the present invention.

For example, as illustrated in FIG. 4, when the 3D mesh model 30 is defined as a front plane 41, a rear plane 42, a left-side plane 43, a right-side plane 44 according to the four viewpoints, the 3D feature points may be determined in at least two adjacent planes of the front plane 41, the rear plane 42, the left-side plane 43, and the right-side plane 44.

A minimum of one feature point may be necessarily determined in one of two adjacent planes. In FIG. 4, an example where eleven 3D feature points are determined in the front plane 41 and the left-side plane 43 adjacent to each other is illustrated.

3D feature points may be provided as at least four. The reason is because at least four 3D feature points are algorithmically needed in fitting a 3D mesh model to a 2D learning image.

When the feature point determination module 140_1 determines 3D feature points in a 3D mesh model according to a user input, the feature point determination module 140_1 may transfer 3D region coordinates, corresponding to the determined 3D feature points based on the 3D mesh model, to the fitting module 140_3.

Fitting Module 140_3

The fitting module 140_3 may call a 2D learning image in a database (133 of FIG. 1) and may fit the 3D mesh model to the called 2D learning image, based on the 3D region coordinates transferred from the feature point determination module 140_1.

In order to fit the 3D mesh model to the 2D learning image, camera information calibrated through camera calibration may be needed, and the calibrated camera information may be obtained from the calibration module 140_5.

The calibration module 140_5 may perform camera calibration on camera information about the camera 120 to calculate a rotation conversion matrix and a parallel movement conversion matrix for fitting the 3D mesh model to the 2D learning image.

The fitting module 140_3 may select 2D feature points corresponding to 3D coordinates of 3D feature points transferred from the feature point determination module 140_1 and may fit the 3D mesh model to the 2D learning image so as to match the 3D feature points with the selected 2D feature points, based on the rotation conversion matrix and the parallel movement conversion matrix each included in the calibrated camera information.

Data Extraction Module 140_7

The data extraction module 140_7 may extract learning, needed for the pose estimation of the vehicle, from the 2D learning image with the 3D mesh model fitted thereto.

As the 3D mesh model is fitted to the 2D learning image, learning data, such as 3D geometrical information (i.e., a position (a three-axis position), a direction (three-axis bearings), a kind, a size, and a shape of the vehicle included in the 3D mesh model, needed for pose estimation may be obtained from the 2D learning image.

The learning data may include shape information about a vehicle image obtained by the 3D mesh model removing a background from the 2D learning image, an identifier (ID) representing a kind of the vehicle image, classification information including a class and a color, and pose information including a position, a direction, and a size obtained from geometrical information about the 3D mesh model projected onto the 2D learning image. The classification information may be information generated through a previous classification operation in a process of building the database 133 including the 2D learning image. The classification information may be previously stored in the database 133 along with the 2D learning image and may be called from the database 133 according to a request of the data extraction module 140_7.

Additionally, the learning data may further include camera information calibrated by the calibration module 140_5.

Learning data obtained from the 2D learning image may be stored in a database (135 of FIG. 1).

Learning Module 140_9

The learning module 140_9 may generate multi-input information including the shape information, the classification information, the pose information, and the calibrated camera information each included in the learning data and may learn a pose estimation model so as to estimate a pose of a target moving object included in a single image captured by the camera 120, based on the multi-input information. Deep learning may be used as a learning method. A pose estimation model learned based on deep learning may include a neural network or a deep neural network.

Since the pose estimation model is a model learned based on the multi-input information including the shape information, the classification information, the pose information, and the calibrated camera information, a plurality of recognition steps divided based on a kind, a pose (a position and a direction), an appearance, and a size for pose estimation may be merged into one step by one pose estimation model. As a result, a pose estimation model learned based on the multi-input information may estimate all of a pose, a shape, a size, and a kind of a vehicle, based on one image.

When a pose estimation model learned by the learning module 140_9 is built, the built pose estimation model may be stored in the database 137.

Pose Estimation Module 140_11

When one image is input from the camera 120, the pose estimation module 140_11 may call a pose estimation model stored in the database 137 and may estimate a pose of a target moving object included in one image by using the called pose estimation model.

The pose estimation module 140_11 may extract a target vehicle image including a target vehicle from one image, for constructing the target moving object (the target vehicle) as an input of the pose estimation model from the input one image.

An image processing algorithm such as an object extraction algorithm may be used for extracting the target vehicle image. The image processing algorithm may be technology known to those skilled in the art, and thus, its description is omitted.

The pose estimation module 140_11 may estimate a pose based on the target vehicle image extracted from the one image by using the pose estimation model.

The pose estimation module 140_11 may store a pose estimation result in the database 135 and may update learning data, stored in the storage unit, to learning data including the pose estimation result.

The learning module 140_9 may relearn the pose estimation model by using the updated learning data. Therefore, a prediction performance of the pose estimation model may be continually updated.

As described above, in the present embodiment, a 3D mesh model may be fitted to a 2D learning image, and thus, learning data including pieces of 3D information robust to pose estimation may be constructed from the 2D learning image with the 3D mesh model fitted thereto.

A process of learning a pose of a moving object by using the learning data may denote that a pose of a moving object included in a corresponding image is estimated based on only one image without processing a plurality of images.

Figure 5:
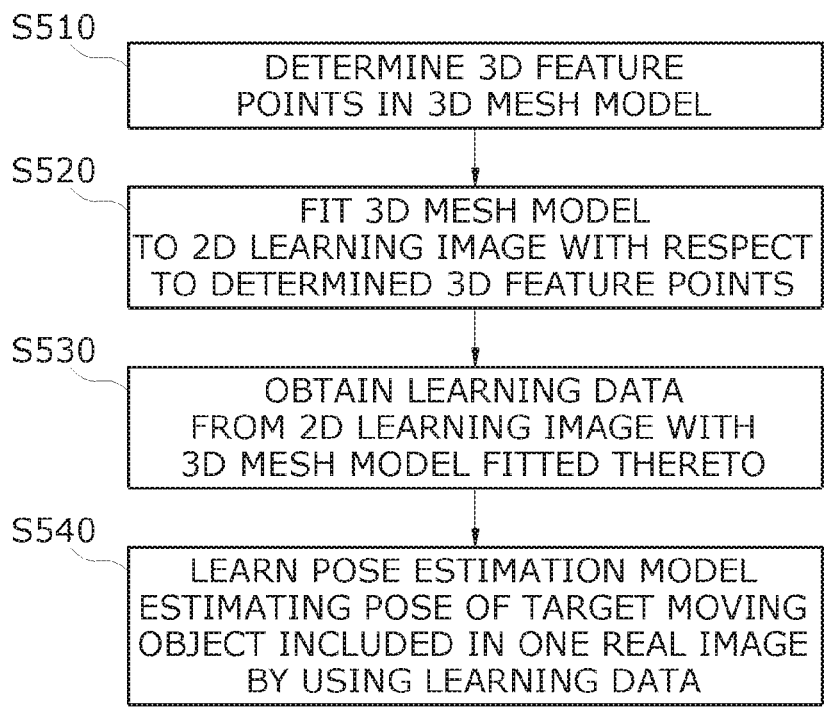
FIG. 5 is a flowchart illustrating a method of learning a pose of a moving object according to an embodiment of the present invention.

FIG. 5 is a flowchart illustrating a method of learning a pose of a moving object according to an embodiment of the present invention.

Each of the following processes may be implemented with a code readable by a processor or a computing device including the processor. The code may be stored in a recording medium readable by a processor or a computing device including the processor. The recording medium may include all kinds of recording devices storing data readable by a processor or a computing device including the processor. Examples of the recording medium may include ROM, RAM, CD-ROM, a magnetic tape, a floppy disk, and optical data storage device.

Referring to FIG. 5, in step S510, a process of determining 3D feature points in a 3D mesh model obtained by previously modeling a general shape of a moving object according to a user input received through an input interface may be performed by the processor module 140 or the feature point determination module 140_1.

The 3D feature points may be feature points which are recognized by a user as a feature robust to pose estimation of the moving object in the 3D mesh model, based on a user input.

The 3D feature points may be constructed to have a correlation therebetween in the 3D mesh model so as to fit the 3D mesh model to the 2D learning image, based on a user input.

The 3D feature points may be determined in at least two adjacent planes of a front plane, a rear plane, a left-side plane, and a right-side plane to have a correlation therebetween, based on a user input.

The 3D feature points may include a center of an emblem, a corner of a radiator grille, a corner of an air intake hole, a corner of a vehicle number plate, a corner of a taillight, a corner of a muffler, a hub of a wheel, a corner of a side mirror, and a corner of a pillar that connects a loop and a bod of a vehicle.

Subsequently, in step S520, a process of fitting the 3D mesh model to a 2D learning image obtained by previously photographing a real shape of the moving object with respect to the determined 3D feature points may be performed by the processor module 140 or the feature point determination module 140_1.

Subsequently, in step S530, a process of obtaining learning data associated with pose estimation of the moving object from the 2D learning image with the 3D mesh model fitted thereto may be performed by the processor module 140 or the feature point determination module 140_1. Here, the learning data may include shape information about an object image obtained by removing a background from the 2D learning image, an ID representing a kind of the object image, classification information including a class and a color, and pose information including a position, a direction, and a size obtained from geometrical information about the 3D mesh model projected onto the 2D learning image.

Subsequently, in step S540, a process of learning a pose estimation model estimating a pose of a target moving object included in one real image by using the learning data may be performed by the processor module 140 or the feature point determination module 140_1. Here, a learning method may be machine learning. The machine learning may be, for example, deep learning which learns a multilayer neural network or a deep neural network.

Figure 6:
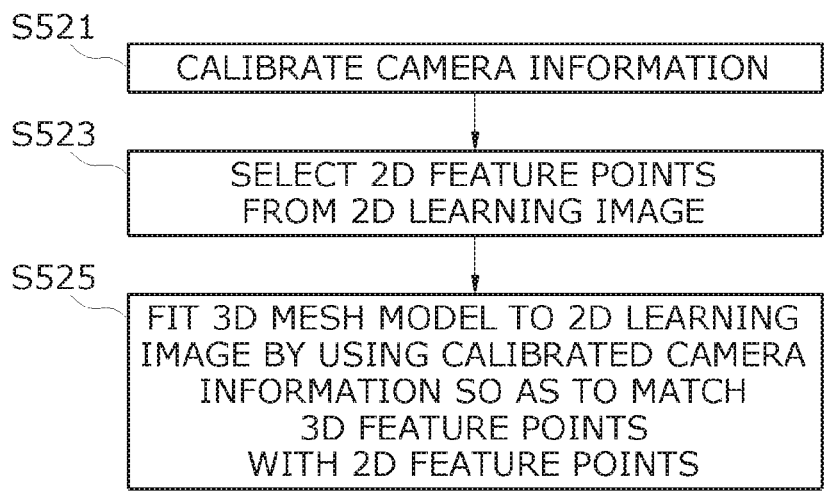
FIG. 6 is a detailed flowchart of step S520 illustrated in FIG. 5.

FIG. 6 is a detailed flowchart of step S520 illustrated in FIG. 5.

Referring to FIG. 6, in step S521, a process of calibrating camera information about a camera capturing the 2D learning image and the one real image to calculate a rotation conversion matrix and a parallel movement conversion matrix may be performed.

Subsequently, in step S523, a process of selecting 2D feature points corresponding to the 3D feature points from the 2D learning image may be performed.

Subsequently, in step S525, a process of fitting the 3D mesh model to the 2D learning image by using the rotation conversion matrix and the parallel movement conversion matrix so as to match the 3D feature points with the selected 2D feature points may be performed.

As described above, according to the embodiments of the present invention, a pose estimation model learned to estimate a pose of a moving object may be built by using learning data processed based on a 3D mesh model, and thus, the pose of the moving object may be estimated based on one image including the moving object.

Moreover, according to the embodiments of the present invention, since the pose of the moving object is estimated based on the one image, a processing speed may be enhanced, and thus, processing may be performed in real time.

Moreover, according to the embodiments of the present invention, the 3D mesh model obtained by previously modeling a general shape of the moving objet may be fitted to a 2D learning image obtained by capturing a real shape of a vehicle, and learning data for learning the pose estimation model may be collected from the 2D learning image with the 3D mesh model fitted thereto, thereby constructing accurate learning data robust to the pose estimation of the moving object.

Moreover, according to the embodiments of the present invention, the constructed learning data may include information associated with a position, a direction, a kind, a size, a class, a shape, and the like of the moving object, and the pose estimation model for estimating the pose of the moving object may be built by using the learning data. Accordingly, a pose including the position (a three-axis position) and direction (three-axis bearings) of the moving object included in the one image and the class of the moving object may be simultaneously estimated even without a high-cost 3D sensor or stereo vision.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of learning a pose of a moving object, performed by a pose learning apparatus including a camera, an input interface, a storage unit storing a three-dimensional (3D) mesh model and a two-dimensional (2D) learning image, and a processor module processing the 2D learning image on basis of the 3D mesh model, the method comprising:

by using the processor module, determining 3D feature points in the 3D mesh model obtained by previously modeling a general shape of a moving object;

fitting the 3D mesh model to the 2D learning image obtained by previously photographing the real shape of the moving object with respect to the determined 3D feature points;

obtaining learning data associated with pose estimation of the moving object from the 2D learning image with the 3D mesh model fitted thereto; and learning a pose estimation model estimating a pose of a target moving object included in one real image obtained by the camera by using the learning data, wherein the fitting comprises:

calibrating camera information about the camera through camera calibration;

selecting 2D feature points corresponding to the 3D feature points from the 2D learning image; and fitting the 3D mesh model to the 2D learning image by using the calibrated camera information to match the 3D feature points with the 2D feature points.

2. The method of claim 1, wherein the determining of the 3D feature points comprises determining 3D feature points which are recognized by a user as a feature robust to pose estimation of the moving object in the 3D mesh model, based on a user input received through the input interface.

3. The method of claim 1, wherein the determining of the 3D feature points comprises determining the 3D feature points constructed to have a correlation therebetween, for fitting the 3D mesh model to the 2D learning image.

4. The method of claim 2, wherein the determining of the 3D feature points comprises determining the 3D feature points in at least two adjacent planes of a front plane, a rear plane, a left-side plane, and a right-side plane of the 3D mesh model in order for the 3D feature points to have a correlation therebetween.

5. The method of claim 1, wherein, when the 3D mesh model is a vehicle, the 3D feature points comprise a center of an emblem, a corner of a radiator grille, a corner of an air intake hole, a corner of a vehicle number plate, a corner of a taillight, a corner of a muffler, a hub of a wheel, a corner of a side mirror, and a corner of a pillar that connects a loop and a bod of a vehicle.

6. The method of claim 1, wherein the obtaining of the learning data comprises obtaining the learning data which includes shape information about an object image obtained by removing a background from the 2D learning image, an identifier representing a kind of the object image, classification information including a class and a color, pose information including a position (a three-axis position), a direction (three-axis bearings), and a size obtained from geometrical information about the 3D mesh model projected onto the 2D learning image, and the camera information calibrated through the camera calibration.

7. The method of claim 6, wherein the pose estimation model comprises a deep neural network, and the learning of the pose estimation model comprises generating multi-input information including the shape information, the classification information, and the pose information so as to estimate the pose of the moving object from the one real image and learning the deep neural network to estimate the pose of the moving object from the multi-input information according to a deep learning technique.

8. An apparatus for learning a pose of a moving object, the apparatus comprising:

a camera;

an input interface;

a storage unit configured to store a three-dimensional (3D) mesh model obtained by previously modeling a general shape of a moving object and a two-dimensional (2D) learning image captured by photographing a real shape of the moving object; and a processor module configured to process the 2D learning image, based on the 3D mesh model, wherein, based on a user input received through the input interface, the processor module fits the 3D mesh model to the 2D learning image with respect to 3D feature points determined in the 3D mesh model, obtains learning data associated with pose estimation of the moving object from the 2D learning image with the 3D mesh model fitted thereto, and learns a pose estimation model estimating a pose of the moving object included in one real image captured by the camera by using the obtained learning data, wherein the camera calibrates camera information about the camera through camera calibration;

wherein 2D feature points corresponding to the 3D feature points are selected from the 2D learning image; and wherein the 3D mesh model is fitted to the 2D learning image by using the calibrated camera information to match the 3D feature points with the 2D feature points.

9. The apparatus of claim 8, wherein the processor module determines 3D feature points which are recognized by the user as a feature robust to the pose estimation of the moving object in the 3D mesh model, based on the user input.

10. The apparatus of claim 8, wherein, the processor module determines the 3D feature points in at least two adjacent planes of a front plane, a rear plane, a left-side plane, and a right-side plane of the 3D mesh model in order for the 3D feature points to have a correlation therebetween, based on the user input.

11. The apparatus of claim 8, wherein the processor module comprises:

a calibration module configured to calibrate the 2D learning image and the camera information about the camera through the camera calibration to calibrate a rotation conversion matrix and a parallel movement conversion matrix; and a fitting module configured to select 2D feature points corresponding to the 3D feature points from the 2D learning image and to fit the 3D mesh model to the 2D learning image by using the rotation conversion matrix and the parallel movement conversion matrix to match the 3D feature points with the 2D feature points.

12. The apparatus of claim 8, wherein the processor module obtains the learning data, which includes shape information about an object image obtained by removing a background from the 2D learning image, an identifier representing a kind of the object image, classification information including a class and a color, and pose information including a position (a three-axis position), a direction (three-axis bearings), and a size obtained from geometrical information about the 3D mesh model projected onto the 2D learning image, from the 2D learning image with the 3D mesh model fitted thereto.

13. The apparatus of claim 8, wherein the processor module learns the pose estimation model, based on a deep learning technique.

14. An apparatus for learning a pose of a moving object, the apparatus comprising:

a camera;

an input interface;

a storage unit configured to store a three-dimensional (3D) mesh model obtained by previously modeling a general shape of a moving object and a two-dimensional (2D) learning image captured by photographing a real shape of the moving object;

feature point determination module configured to determine 3D feature points in the 3D mesh model, based on a user input received through the input interface;

a fitting module configured to fit the 3D mesh model to the 2D learning image;

a data extraction module configured to extract learning data associated with pose estimation of the moving object from the 2D learning image with the 3D mesh model fitted thereto and to store the extracted learning data in the storage unit;

a learning module configured to learn a pose estimation model estimating a pose of a target moving object by using the learning data stored in the storage unit; and a pose estimation module configured to estimate the pose of the target moving object included in one image captured by the camera by using the pose estimation model, wherein the camera calibrates camera information about the camera through camera calibration;

wherein 2D feature points corresponding to the 3D feature points are selected from the 2D learning image; and wherein the 3D mesh model is fitted to the 2D learning image by using the calibrated camera information to match the 3D feature points with the 2D feature points.

15. The apparatus of claim 14, wherein the pose estimation module estimates the pose of the target moving object to obtain a pose estimation result and stores the obtained pose estimation result in the storage unit to update the learning data, stored in the storage unit, to learning data including the pose estimation result.

16. The apparatus of claim 15, wherein the learning model relearns the pose estimation model by using the updated learning data.

17. The apparatus of claim 14, wherein the feature point determination module determines 3D feature points which are recognized by the user as a feature robust to the pose estimation of the moving object in the 3D mesh model, based on the user input.

18. The apparatus of claim 14, wherein the data extraction module obtains the learning data, which includes shape information about an object image obtained by removing a background from the 2D learning image, an identifier representing a kind of the object image, classification information including a class and a color, and pose information including a position (a three-axis position), a direction (three-axis bearings), and a size obtained from geometrical information about the 3D mesh model projected onto the 2D learning image, from the 2D learning image with the 3D mesh model fitted thereto.

19. The apparatus of claim 14, wherein the fitting module converts the 3D mesh model to fit the 3D mesh model to the 2D learning image on basis of the camera information calibrated through the camera calibration, so as to match the 3D feature points with 2D feature points corresponding to the 3D feature points in the 2D learning image.

* * * * *